Sept. 26, 1950     B. F. DOSCHER     2,523,561
CREAM SEPARATOR
Filed Aug. 4, 1947
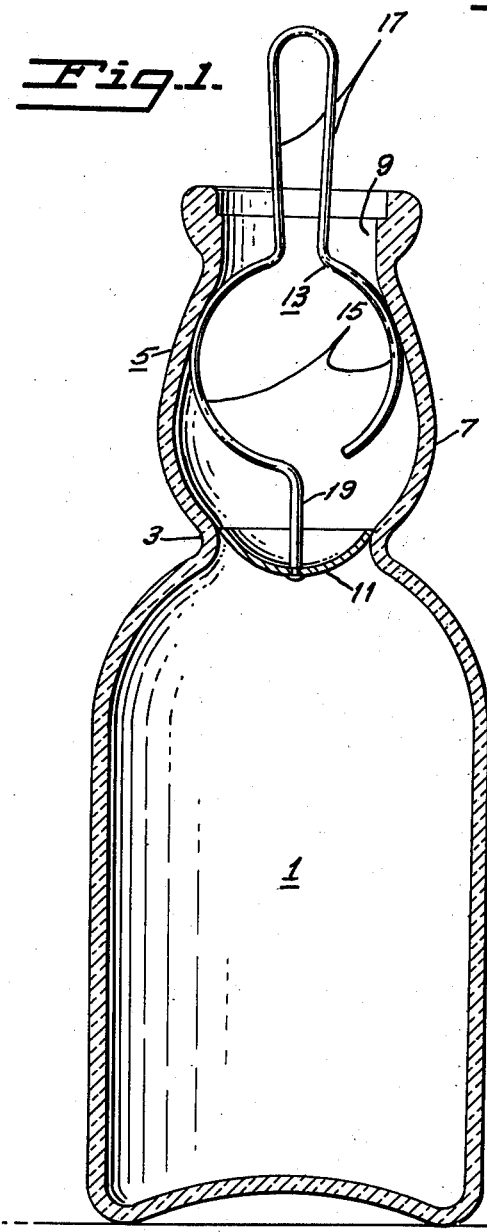
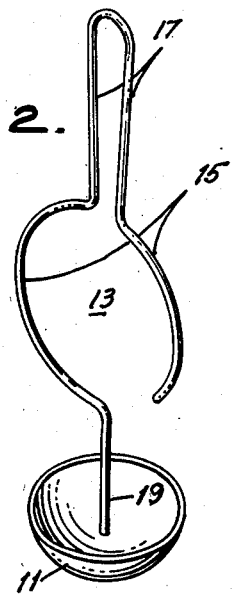
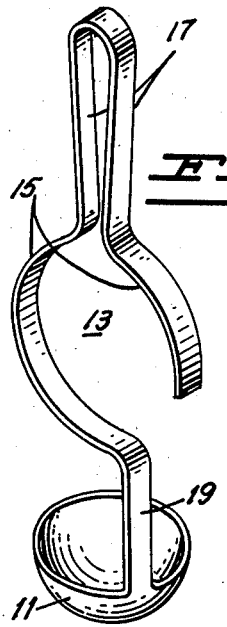
INVENTOR.
BERNHARD F. DOSCHER
BY
HIS ATTORNEYS Patented Sept. 26, 1950

2,523,561

UNITED STATES PATENT OFFICE 2,523,561

CREAM SEPARATOR

Bernhard F. Doscher, Berkeley, Calif.

Application August 4, 1947, Serial No. 766,010

4 Claims. (Cl. 210—51.5)

My invention relates to cream separators, and more particularly to a device for separating the cream from the milk in a milk bottle.

Among the objects of my invention are:

(1) To provide a novel and improved cream separator;

(2) To provide a novel and improved cream separator for use in removing cream from milk in milk bottles;

(3) To provide a novel and improved device for use in removing cream from milk in milk bottles, which device shall be exceedingly simple in construction yet very efficient in its operation.

Additional objects of my invention will be brought out in the following description of the same, taken in conjunction with the accompanying drawings wherein:

Figure 1 is a longitudinal view, in section, through a conventional type milk bottle and illustrating one embodiment of my invention in its functional position;

Figure 2 is a three-dimensional view of the embodiment of my invention depicted in Figure 1;

Figure 3 is a corresponding three-dimensional view of a second embodiment of my invention.

Referring to the drawings, the device of my invention is designed for the separation of cream from milk, in that type of milk bottle 1 having a constriction 3 at substantially the cream line. In certain of these bottles, the neck 5 which is that portion above the constriction, is formed with a bulge 7 and tapers off slightly to a smaller diameter at the mouth 9 of the bottle.

The device of the present invention for separating cream from the milk in such a bottle, involves a flexible disk 11 of a diameter slightly greater than the diameter of the bottle in the plane of such constriction.

Resilient means 13 is provided for holding such disk against the constriction after inserting the same into the bottle, whereby to form a closure for that portion of the bottle below the constriction. With the disk so disposed, the cream may be poured from the bottle without disturbing the milk which has been closed off by the disk, thus leaving what is thereafter termed "skimmed" milk.

The disk may be planar and formed of sheet plastic or metal, but when formed of metal, I prefer to cup the same slightly, which imparts to it better sealing properties, in addition to making it more or less self-centering when urging the disk into its sealing position.

The means for holding the disk in its sealing position is resilient in character as previously indicated, and involves an open loop of resilient material such as steel wire of relatively heavy gauge, such including an intermediate portion 15 thereof deformed laterally in substantially the plane of the loop, to a total spread greater than the diameter at the mouth of the bottle. This leaves a closed end portion 17 of the loop to function as a handle and at the same time constitute a U-shaped spring tending to spread the deformed portion of the loop into engagement with the inner wall of the neck of the bottle, following insertion of the same into the bottle.

The disk is joined to the open end of the loop, preferably to one leg 19 thereof, and in the embodiment illustrated in Figures 1 and 2, such leg is shown extended for the purpose and the disk is affixed at its center to the end of this leg.

In the modified embodiment of Figure 3, the resilient loop is formed of metallic ribbon and is shown as being integral with the cupped disk, being joined thereto at a point on its rim. It will be readily apparent, however, that the loop could be formed separately and united or joined to the disk as by riveting or welding.

In utilizing the device for its intended purpose, the disk is inserted into the upper end of the bottle, the loop being contracted to permit such insertion, until the disk engages the shoulder formed by the constriction. In this position, it will be maintained by the spreading force of the loop against the inner wall of the neck of the bottle. In this condition, no obstruction is offered to the free flow of the cream from the bottle when it is tipped to a position for pouring, and the cream may then be poured to the exclusion of the milk below the neck of the bottle.

In those bottles, where the neck is bulged and tapers to a smaller diameter at the mouth of the bottle, the tapering inner surface of the neck has the effect of exerting a downward component of force against the deformed portion of the loop, thereby maintaining a positive pressure against the disk and adding to its efficiency as a closure and sealing member.

It will be apparent from the above, that my invention fulfills all the objects previously attributed thereto. While I have disclosed the same in considerable detail, the invention as disclosed, is subject to alteration and modification without departing from the broad aspects thereof, and I accordingly do not desire to be limited in my protection to such details, except as may be necessitated by the appended claims.

I claim:

1. A cream separator for a milk bottle having a constriction at substantially the cream line, comprising a disk of a diameter slightly greater than the inside diameter of said bottle in the plane of such constriction, and resilient means for holding said disk in pressure engagement against such constriction when said resilient means is inserted into such bottle and released, said resilient means involving a loop of material having an intermediate portion thereof deformed laterally in substantially the plane of said loop to a total distance greater than the diameter of the mouth of such bottle, leaving the closed end portion of said loop to function both as a handle and a U-shaped spring tending to spread said deformed portion into engagement with the inner wall of such bottle when inserted therein and released, said disk being joined to the open end of said loop.

2. A cream separator for a milk bottle having a constriction at substantially the cream line, comprising a disk of a diameter slightly greater than the inside diameter of said bottle in the plane of such constriction, and resilient means for holding said disk in pressure engagement against such constriction when inserted into such bottle and released, said resilient means involving an open loop of resilient material having an intermediate portion thereof deformed laterally in substantially the plane of said loop to a total distance greater than the diameter of the mouth of such bottle, leaving the closed end portion of said loop to function both as a handle and a U-shaped spring tending to spread said deformed portion into engagement with the inner wall of such bottle when inserted therein, said disk being joined to the open end of said loop.

3. A cream separator for a milk bottle having a constriction at substantially the cream line, comprising a flexible cupped disk of a diameter slightly greater than the inside diameter of said bottle in the plane of such constriction, and resilient means for holding said disk in pressure engagement against such constriction when inserted into such bottle, said resilient means involving an open loop of resilient material having an intermediate portion thereof deformed laterally in substantially the plane of said loop to a total distance greater than the diameter of the mouth of such bottle, leaving the closed end portion of said loop to function both as a handle and a U-shaped spring tending to spread said deformed portion into engagement with the inner wall of such bottle when inserted therein, said disk being joined to the open end of said loop.

4. A cream separator for a milk bottle having a constriction at substantially the cream line, comprising a flexible cupped disk of a diameter slightly greater than the inside diameter of said bottle in the plane of such constriction, and resilient means for holding said disk in pressure engagement against such constriction when inserted into such bottle and released, said resilient means involving an open loop of resilient wire having an intermediate portion thereof deformed laterally in substantially the plane of said loop to a total distance greater than the diameter of the mouth of such bottle, leaving the closed end portion of said loop to function both as a handle and a U-shaped spring tending to spread said deforming portion into engagement with the inner wall of such bottle when inserted therein, said disk being joined to the open end of said loop.

BERNHARD F. DOSCHER.

REFERENCES CITED

The following references are of record in the file of this patent:

UNITED STATES PATENTS

| Number | Name | Date |
|---|---|---|
| 1,593,839 | Mies | July 27, 1926 |
| 1,974,343 | Nelson | Sept. 18, 1934 |
| 2,060,738 | Lindroos | Nov. 10, 1936 |
| 2,222,511 | McAllister | Nov. 19, 1940 |
| 2,267,654 | Hedenskoog | Dec. 23, 1941 |
| 2,278,541 | Kent | Apr. 7, 1942 |
| 8,315,178 | Aroney | Mar. 30, 1943 |